US00RE37212E

(19) United States
(12) Reissued Patent
Marshall

(10) Patent Number: US RE37,212 E
(45) Date of Reissued Patent: Jun. 12, 2001

(54) TAPE MEASURE

(76) Inventor: Forrest A. Marshall, 615 Academy Ave., Dublin, GA (US) 31021

(21) Appl. No.: 09/469,495

(22) Filed: Dec. 17, 1999

Related U.S. Patent Documents

Reissue of:
(64) Patent No.: 5,913,586
Issued: Jun. 22, 1999
Appl. No.: 08/889,639
Filed: Jul. 8, 1997

U.S. Applications:
(60) Provisional application No. 60/021,468, filed on Jul. 10, 1996.

(51) Int. Cl.[7] ..... G01B 3/10; G01B 3/04
(52) U.S. Cl. ..... 33/759; 33/494; 33/679.1; 33/520; 33/644; 434/209
(58) Field of Search ..... 33/759, 483, 494, 33/758, 679.1, 520, 644; 434/188, 191, 205, 209

(56) References Cited

U.S. PATENT DOCUMENTS

| | | | |
|---|---|---|---|
| Re. 11,450 | 10/1894 | Steck . | |
| 239,691 | 4/1881 | Appleton . | |
| 543,897 | 8/1895 | Schaer . | |
| 543,997 | 8/1895 | Mallin | 33/494 |
| 1,663,293 | 3/1928 | Cook . | |
| 1,776,245 | 9/1930 | Barrett | 33/494 |
| 2,569,202 | 9/1951 | Solomon . | |
| 3,270,421 | 9/1966 | Jones | 33/759 |
| 3,289,305 | 12/1966 | Norton . | |
| 4,149,320 | 4/1979 | Troyer et al. | 33/758 |
| 4,159,571 | 7/1979 | Jervis, Jr. | 33/403 |
| 4,247,986 | 2/1981 | Burroughs | 33/494 |
| 4,301,596 | 11/1981 | Sedlock | 33/494 |
| 4,484,395 | 11/1984 | Samuels | 33/494 |
| 4,490,921 | 1/1985 | Woods et al. | 33/476 |
| 4,499,666 | 2/1985 | Smith . | |
| 4,574,486 | 3/1986 | Drechsler | 33/755 |
| 4,750,270 | 6/1988 | Kundikoff | 33/494 |
| 5,012,590 | 5/1991 | Wagner et al. | 33/759 |
| 5,251,382 | 10/1993 | Hellar | 33/759 |
| 5,335,421 * | 8/1994 | Jones, Jr. | 33/494 |

FOREIGN PATENT DOCUMENTS 408 083 3/1910 (FR) .

OTHER PUBLICATIONS

New E–Z Read, Olympia Industrial, Inc., City of Industry, Georgia, undated.

* cited by examiner

*Primary Examiner*—Christopher W. Fulton
(74) *Attorney, Agent, or Firm*—Kristin Johnson; Dean W. Russell; Kilpatrick Stockton LLP

(57) ABSTRACT

A tape measure is provided in which orientation of the primary indicia are varied to allow reading of measurements from either side. A centering strip is provided which gives fractional values corresponding to the primary indicia, thus allowing easy calculation of certain fractions of a given measurement. Other visual aids for improving ease of use are provided, such as stud centering marks, distinct colors and variations in numeral and hatch mark sizing.

20 Claims, 2 Drawing Sheets

TAPE MEASURE

Matter enclosed in heavy brackets [ ] appears in the original patent but forms no part of this reissue specification; matter printed in italics indicates the additions made by reissue.

This application claims the benefit of U.S. Provisional Application No. 60/021,468, filed Jul. 10, 1996.

BACKGROUND OF THE INVENTION

Carpenters, woodworkers and others involved in the construction of structures, furniture and other goods typically rely on some form of measuring tool in laying out the dimensions of the object being constructed. Perhaps the most common tool of this sort is the tape measure. Despite its popularity, however, the typical tape measure is not always easy to use, given the frequency and typical conditions of use. For instance, carpenters must often take several measurements in multiple directions from one position. As a result, many of the measurements must be read "upside-down" as tape measures are frequently marked in only one orientation. Furthermore, measurements must often be made in many different intervals, i.e., eighths or sixteenths of an inch. A typical tape measure may use very similar markings between such intervals, increasing the risk of an erroneous reading. In construction, measurements are typically made in a single unit, such as inches. Nonetheless, many tape measures are marked in mixed units, such as feet and inches, further increasing the risk of erroneous readings.

Users must frequently identify some fraction of an overall measurement, e.g., a carpenter may need to know the center-point of board he or she has just measured. Tape measures typically do not provide mechanisms for readily identifying such a fraction.

Some measurements made during construction occur on regularly repeating intervals, such as laying studs on sixteen or twenty-four inch centers. It would be desirable to provide a tape measure that easily allows these repetitive measurements to be made.

DETAILED DESCRIPTION OF THE DRAWINGS

Figure 1:
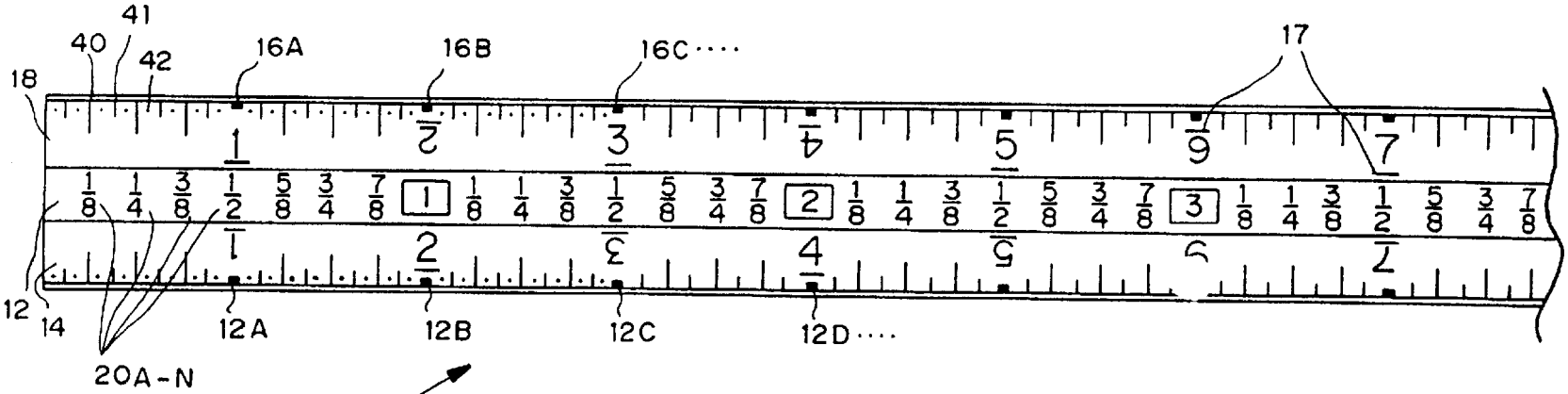
FIG. 1 is a front view of a first portion of an illustrative embodiment of the tape measure according to the present invention.

FIGS. 1–4 illustrate a carpenter's tape measure 10 according to the present invention. Tape 10 features indicia 12A–N on a first indicator strip 14, indicia 16A–N on a second indicator strip 18, indicia 20A–N on a centering strip 22 and stud centering marks 30. Indicia 12A–N, 16A–N, 20A–N may be numerals or other symbols useful for indicating units of distance. Indicia 12A–N, 16A–N, and 20A–N are evenly spaced on a linear scale so that measurements of units of distance may be taken with reference thereto.

Indicia 12A–N on strip 14 alternate between the upright and upside-down positions. In other words, if 12A is upside-down, 12B is upright and so on. Indicia 16A–N likewise alternate between the upright and upside-down positions, although the pattern complements that of inidicia 12A–N. Thus, if 12A is upside-down, 16A is upright, and so on for the extent of tape 10. In addition, indicia that are in the same orientation, i.e., 16A, 12B, 16C, 12D, etc. (the nominally upright indicia), may be sized differently that the complementary set of indicia. By this, the user more easily may distinguish one set of indicia from another. (Of course, as the position of tape is changed, e.g., if the tape is rotated one-hundred and eighty degrees, first one and then the other set of indicia will be "upright.")

Because tape 10 is marked in the manner described, a user easily may take multiple measurements in multiple directions without changing position or reading symbols that are upside-down. For example, a carpenter standing along one side of a board may wish to take measurements of the board in both the left and right directions. With a conventional tape measure, the carpenter would either have to move about in order to take the measurements, or take at least some of the measurements by reading the tape measure in an upside-down position. Using tape 10, however, the carpenter may take measurement of the board to the right and left of his position and read from the set of indicia which is upright. To increase further the ease of reading, each indicia 12A–N, 16A–N may bear an underline 17 which indicates to the user the bottom of the symbol, thereby facilitating the identification by the user of the indicia that are upright in the given position.

Fractional divisions of units of length defined by indicia 12A–N and 16A–N are denoted by hatch marks 40, 41 and 42. For instance, if the scale of tape 10 is in inches, hatch marks 40 represent one-quarter inch divisions, hatch marks 41 represent one-eight inch divisions and hatch marks 42 represent one-sixteenth inch divisions. To improve ease of reading, the length of each hatch mark may be varied according to the fraction it represents. Thus, hatch marks 40 may be longer than hatch marks 41. Likewise, hatch marks 42 may be dots rather than lines to further distinguish that fraction from the others. Furthermore, each hatch mark may extend to the very edge of the tape measure.

Indicia 20A–N are distributed linearly along centering strip 22. The quantitative value of indicia 20A–N is some fractional value of indicia 12A–N, 16A–N. For example, it is often necessary, when measuring construction materials, to determine the center of the material being measured. Thus, if indicia 20A–N are calibrated to indicate exactly one-half of the quantitative value of indicia 12A–N, 16A–N to which indicia 20A–N are proximate, the user easily can identify the mid-point of the material. The user reads indicia 12A–N, 16A–N and locates the indicium 12x, 16x representing the overall length of the object. The user may then refer to the proximate indicia 20x, which will show one half of the value indicated by the indicium 12x, 16x. Other fractions may also be used.

Figure 2:
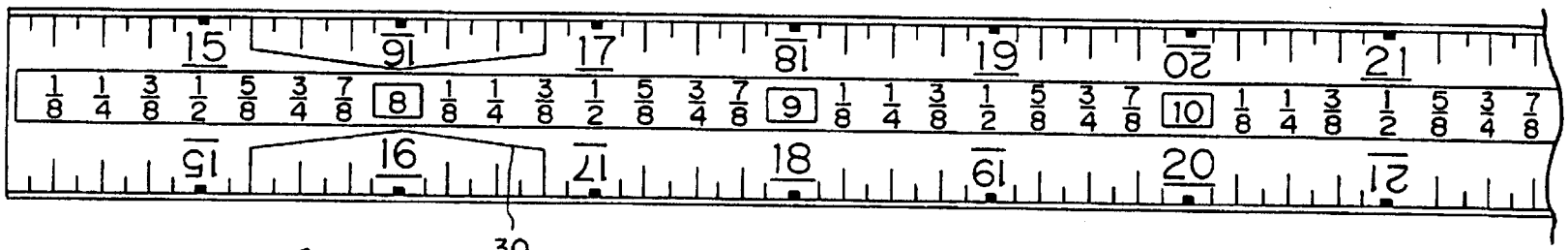
FIG. 2 is a front view of a second portion of the tape measure of FIG. 1.
Figure 3:
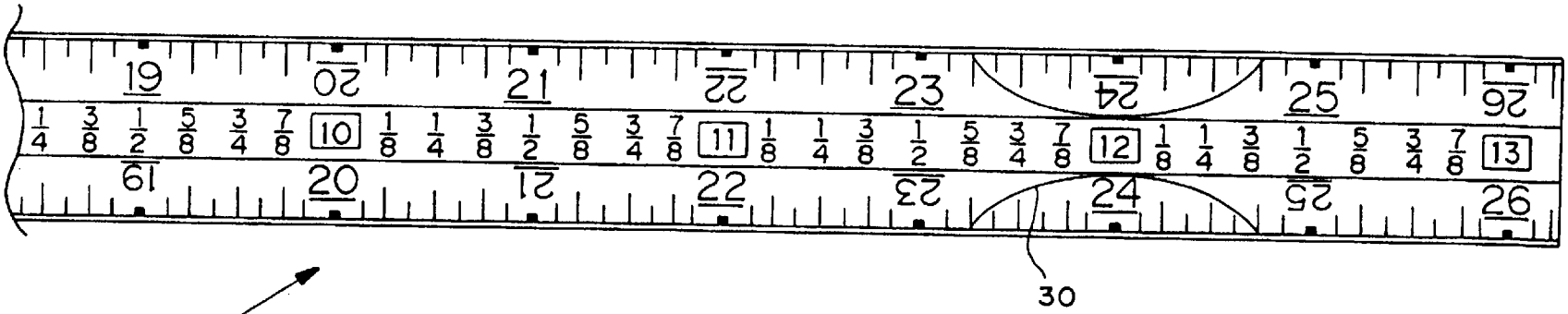
FIG. 3 is a front view of a third portion of the tape measure of FIG. 1.

As illustrated in FIGS. 2 and 3, particular indicia may be highlighted with stud centering marks 30. Marks 30 allow a user easily and rapidly to mark the proper spacing for studs or other regularly occurring structures. In the illustrative embodiment, the sixteen and twenty-four inch marks are bracketed with marks 30, as these distances are the most common spacings for studs. Other intervals may be used as appropriate.

Marks 30 may be provided over the entire length of tape 10. For instance, marks 30 for measuring sixteen inch centers may be placed at indicia 12A–N, 16A–N indicating inches sixteen, thirty-two, forty-eight and so on. Marks 30 for measuring twenty-four inch centers may be placed at indicia 12A–N, 16A–N indicating inches twenty-four, forty-eight and so on. Marks 30 for measuring different intervals may be visually distinct. For instance, marks 30 for sixteen inch centers may be squared off, whereas marks for twenty-four inch centers may be rounded. In this manner, the different stud centering intervals are easily distinguished. Where such marks coincide, such as at the forty-eight inch mark (not shown), marks 30 for the differing intervals may overlap, the differences between each marking allowing both to be readily identified.

Marks 30 may be bracketed around the desired indicia so that the width of the typical structure can be accounted for. Thus, as illustrated in FIGS. 2 and 3, marks 30 span a distance of one and one-half inches, the width of a standard "two by four" stud, and are centered on the desired point. In this manner, the user can mark the desired center-point of the stud, as well as its boundaries, eliminating the chance of an erroneous reading of markings made on the structure.

Figure 4:
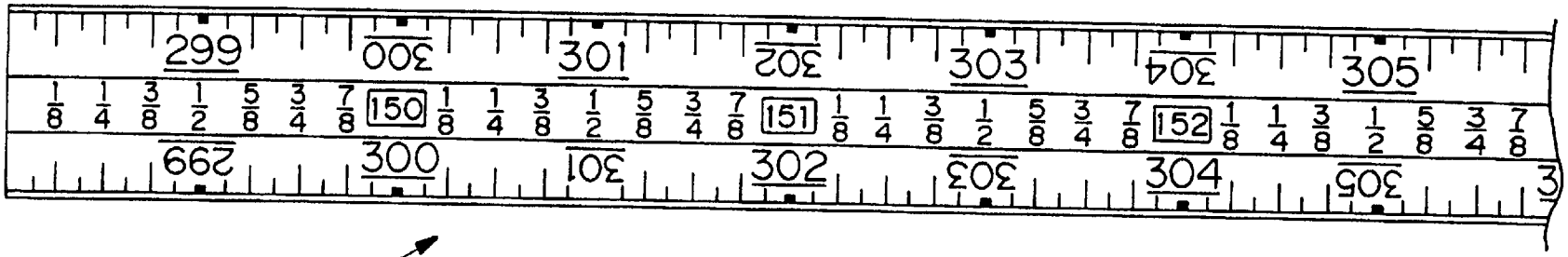
FIG. 4 is a front view of a fourth portion of the tape measure of FIG. 1.

Other features may also be included to increase the ease of use of tape 10, while reducing the risk of erroneous measurements. For instance, tape 10 may employ a contrasting color scheme to improve ease of reading. Indicia 12A–N, 16A–N, 20A–N may be numbered out in single unit, e.g., inches, as illustrated in FIG. 4. Thus, large readings can be made in inches alone rather than as a combination of inches and feet.

Each of the features described herein may be used alone or in combination. The effect of these features, either alone or in combination, is to ease the task of taking the numerous measurements associated with construction by providing readily distinguishable visual cues to the user.

Although the foregoing is provided for purposes of illustrating, explaining and describing embodiments of the present invention, modifications and adaptations to these embodiments will be apparent to those skilled in the art and may be made without departing from the scope or spirit of the invention.

What is claimed is:

1. A tape measure comprising:

a) a first indicator strip bearing a first plurality of evenly spaced indicia in a first pattern in which adjacent indicia of the first pluraltiy of indicia are oriented differently;

b) a second indicator strip bearing a second plurality of evenly spaced indicia in a second pattern in which adjacent indicia of the second plurality of indicia are oriented differently and the second pattern complements the first pattern; and c) a third indicator strip bearing a third plurality of evenly spaced indicia in which the third plurality of indicia have a quantitative value defining a fractional value of the first and second plurality of indicia.

2. The tape measure of claim 1 in which indicia of the first and second pluralities of indicia are sized differently than adjacent indicia.

3. The tape measure of claim 1 in which each of the indicia are marked with a symbol which indicates the orientation of the indicia.

4. The tape measure of claim 1 further comprising a plurality of hatch marks defining evenly spaced, fractional intervals between each of the indicia of the first and second pluralities of indicia.

5. The tape measure of claim 4 in which the each of the hatch marks are varied in size in proportion to the fractional interval defined thereby.

6. The tape measure of claim 1 in which the first indicator strip further comprises a plurality of stud centering marks.

7. The tap measure of claim 6 in which the second indicator strip further comprises a plurality of stud centering marks.

8. The tape measure of claim 6 in which the stud centering marks are calibrated for centers having a first predetermined quantitative value.

9. The tape measure of claim 6 in which the stud centering marks are calibrated for centers having a second predetermined quantitative value.

10. The tape measure of claim 6 in which the stud centering marks are calibrated for centers having a first and second predetermined quantitative value.

11. The tape measure of claim 10 in which the stud centering marks for having the first predetermined quantitative value are visually distinct from the stud centering marks for the second predetermined quantitative value.

12. The tape measure of claim 6 in which the stud centering marks are bracketed.

13. The tape measure of claim 1 in which the third indicator strip is printed with a color which contrasts a color of the first and second indicator strips.

14. A carpenter's tape measure comprising:

a) a long, thin flexible strip having a top surface, a first lateral edge and a second lateral edge;

b) a first set of indicia printed on the top surface adjacent to the first lateral edge, each indicium of the first set being evenly spaced from adjacent indicia of the first set and printed upside-down with respect to adjacent indicia of the first set, in which every other indicium of the first set is of a different size with respect to adjacent indicia of the first set;

c) a second set of indicia printed on the top surface adjacent to the second lateral edge, each indicium of the second set being evenly spaced from adjacent indicia of the second set and printed upside-down with respect to adjacent indicia of the second set, in which every other indicium of the second set is of a different size with respect to adjacent indicia of the second set;

d) in which the first set of indicia is printed so as to correspond to the second set of indicia;

e) in which the orientation all of the indicia is indicated by a symbol printed adjacent to each indicium;

f) a third set of indicia printed on the top surface between the first and second sets of indicia in which the third set of indicia have a quantitative value defining a fractional value of the first and second sets of indicia; and g) a plurality of stud centering brackets printed adjacent to each edge of the strip at predetermined intervals corresponding to the numeric values of the first and second sets of indicia.

*15. A tape measure comprising:*

*a. a first indicator strip bearing a first plurality of evenly spaced indicia for measuring a distance;*

*b. a second indicator strip bearing a second plurality of evenly spaced indicia for measuring a distance; and*

*c. a third indicator strip located between the first and second indicator strips and bearing a third plurality of evenly spaced indicia in which the third plurality of indicia have quantitative values defining a fractional value of the first and second plurality of indicia, wherein at least some of the quantitative values of the third plurality of indicia are expressed as fractions and wherein at least some of the quantitative values of the*

*third plurality of indicia are located on the tape measure adjacent to the first and second plurality of indicia whose fractional value they define.*

*16. The tape measure of claim 15 wherein the first plurality of indicia are arranged in a first pattern in which adjacent indicia of the first plurality of indicia are oriented differently.*

*17. The tape measure of claim 15 further comprising a plurality of hatch marks defining evenly spaced, fractional intervals between each of the indicia of the first and second pluralities of indicia.*

*18. The tape measure of claim 15 wherein the first indicator strip further comprises a plurality of stud centering marks.*

*19. The tape measure of claim 18 wherein the second indicator strip further comprises a plurality of stud centering marks.*

*20. The tape measure of claim 15 wherein the third indicator strip is printed with a color which contrasts a color of the first and second indicator strips.*

* * * * *